United States Patent [19]

Hagin et al.

[11] Patent Number: 4,976,664
[45] Date of Patent: Dec. 11, 1990

[54] VEHICLE DRIVE TRANSMISSION HAVING A HIGH POWER RATIO

[75] Inventors: Faust Hagin; Hans Drewitz, both of Hünchen, Fed. Rep. of Germany

[73] Assignee: Man Nutzfahrzeuge Aktiengesellschaft of Munchen, Fed. Rep. of Germany

[21] Appl. No.: 375,601

[22] Filed: Jul. 5, 1989

[30] Foreign Application Priority Data

Jul. 27, 1988 [DE] Fed. Rep. of Germany ....... 3825409

[51] Int. Cl.$^5$ ............................................. F16H 47/04
[52] U.S. Cl. ........................................ 475/80; 74/720; 475/76
[58] Field of Search ................. 74/687, 793, 730, 720, 74/720.5; 475/72, 75, 76, 80–82, 84, 86

[56] References Cited

U.S. PATENT DOCUMENTS

| | | | |
|---|---|---|---|
| 3,897,697 | 8/1975 | Chambers et al. | 74/687 X |
| 3,969,958 | 7/1976 | Miyao et al. | 74/687 |
| 4,242,922 | 1/1981 | Baudoin | 74/687 |
| 4,313,351 | 2/1982 | Hagin | 180/165 X |
| 4,446,756 | 5/1984 | Hagin et al. | 74/687 |
| 4,754,664 | 7/1988 | Dick | 74/687 |
| 4,776,233 | 10/1988 | Kita et al. | 74/687 |
| 4,815,334 | 3/1989 | Lexen | 74/687 X |
| 4,843,907 | 7/1989 | Hagin et al. | 74/687 |

FOREIGN PATENT DOCUMENTS

| | | | |
|---|---|---|---|
| 2655011 | 6/1978 | France | 74/687 |
| 2482692 | 11/1981 | France | 74/687 |

Primary Examiner—Rodney H. Bonck
Assistant Examiner—Benjamin Levi
Attorney, Agent, or Firm—Julian H. Cohen

[57] ABSTRACT

A drive device for vehicles comprises: a drive prime mover, a power splitting hydrostatic mechanical transmission coupled with the prime mover and having a planetary differential transmission with at least four shafts and two groups of planet wheels, two sun wheels, a web and an annulus, two main shafts forming an input and output and connected with different shafts of the planetary differential transmission, a clutch two variable displacement hydrostatic machines which are respectively connected in at least one operational range with a respective shaft of the planetary differential transmission and are adapted to alternately operate as a pump and as a motor, a first hydrostatic machine which, when the second hydrostatic machine is stationary, being able to be switched over from the input main shaft to the sun wheel, not on the drive side, on transition from one to the other operational range by means of said clutch means and during traction operation is switched over from the motor to the pump function.

An additional mechanical transmission connected to the output of the power splitting transmission and has gering and two clutches for operation in two transmission is ratios, and a controller which on switching from one of the transmission ratios to the other causes actuation of the clutches as well as a sudden opposite modification of the displacement controlling angle of the first and second hydrostatic machines thus causing the displacement of the second hydrostatic machine to be increased to maximum while the displacement of the first machine decreases to zero.

5 Claims, 2 Drawing Sheets

VEHICLE DRIVE TRANSMISSION HAVING A HIGH POWER RATIO

BACKGROUND OF THE INVENTION.

The invention relates to a drive device for vehicles and more especially to a drive device for a wheeled vehicle suitable for use on very rough terrain comprising a drive prime mover coupled with a power splitting hydrostatic-mechanical transmission consisting of a planetary differential drive with at least four shafts, having two groups of planet wheels, two sun wheels, a web and an annulus, and furthermore comprising two main shafts forming the input and output and connected with different shafts of the planetary differential transmission, at least two variable displacement hydrostatic machines which are respectively connected in at least one operational range with a respective shaft of the planetary differential transmission and are adapted to alternately operate as a pump and as a motor, at least one first hydrostatic machine, when the second hydrostatic machine is at least substantially stationary, being able to be switched over from the input main shaft to the sun wheel, not on the drive side, on transition from one to the other operational range by means of clutch means and during traction operation switches over from the motor to the pump function.

A drive device with such features is for instance described in the U.S. Pat. No. 4,313,351. Such vehicle drive systems, designed for instance for city omnibus services, comprises a power splitting hydromechanical transmission with a planetary differential transmission and two hydrostatic machines in the form of adjustable hydrostatic devices able to be used both as a motor and as pump to transmit power, which is the product of the independent maximum permissible values of the parameters defining the power, of the same order of the drive prime mover. This drive system between the drive prime mover and the axle drive train makes possible an expansion of the conversion range or power ratio to a factor of the order of 6. The increase in torque is quite sufficient in the case of omnibuses or regular commercial vehicles.

In the case of drive trains which have to have wide range of conversion, as for instance wheeled vehicles able to be driven on extremely rough terrain, such a drive device has so far not been found satisfactory, because the said increase in the conversion range (by a factor of 6) is still not adequate for starting and at low speeds on terrain which is hard to negotiate. To be adequate for such an application the increase in torque between the drive engine and the axle drive train would have to be by a factor of the order of 25 at full engine power.

SUMMARY OF THE INVENTION.

Accordingly one object of the invention is to provide a drive device of the initially mentioned type which can achieve a conversion range of the order of 25.

In order to achieve this or other objects appearing from the present specification, claims and drawings the system comprises a complementary mechanical transmission connected to the output of the said power splitting transmission and having gearing and two clutches for operation in two transmission ratios, and a controller which on switching from one of the said transmission ratios to the other causes actuation of the clutches as well as a sudden opposite modification of the displacement controlling angle of the said first and second hydrostatic machines to cause the displacement of the second hydrostatic machine to be increased to a maximum while the displacement of the said first machine decreases to zero.

The provision in accordance with the invention of an additional transmission, which is connected with the output of the power slitting transmission and the type of control in accordance with the invention make it possible, to switch over, without previously having to halt the vehicle, from normal speed to a transmission ratio making it possible to drive at a comparatively slow crawl speed with a massive increase in the driving torque. It is also possible to switch over from such low speed travel to a drive transmission ratio, again without stopping, which independently makes it possible to resume normal speed operation.

Embodiments of the invention will now be described with reference to the drawings.

Figure 1:
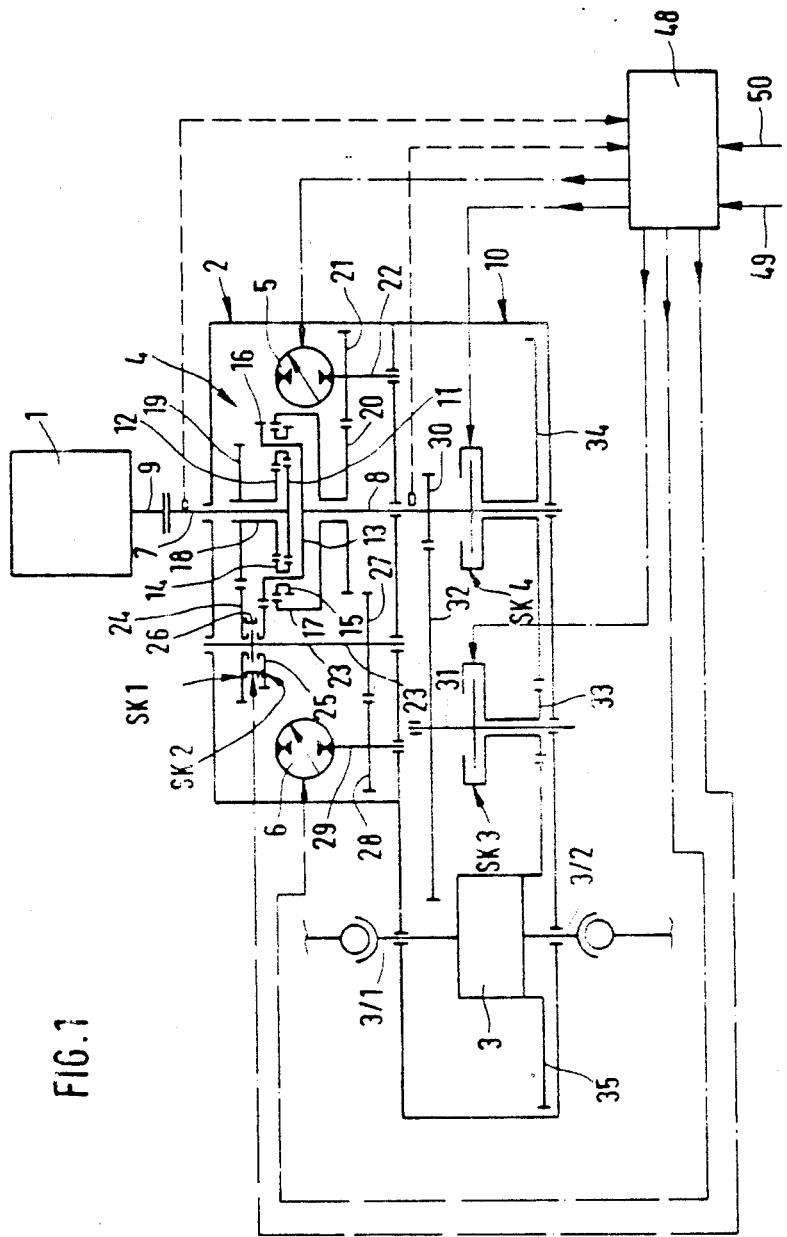
FIG. 1 is a diagram of the first embodiment of the invention.

DETAILED DESCRIPTION OF WORKING EMBODIMENTS OF THE INVENTION.

In the two figures like parts are denoted by like reference numerals.

The drive device, which is for instance part of a vehicle designed for traveling over extremely rough terrain, will be seen in the figures to comprise a drive prime mover 1, as for instance a diesel engine, a power splitting hydromechanical transmission 2, a differential 3 and drive shafts 3/1 and, respectively, 3/2 connecting respectively the front and rear axle drive trains with the two sides of the differential 3. The power splitting transmission 2 has a planetary differential transmission 4 with at least four shafts and at least two hydrostatic machines 5 and 6. The latter are variable displacement hydrostatic machines, which are able to be operated in both directions as motors or pumps and are connected by means of hydraulic lines which are not illustrated. There is a main input shaft 7 and an output main shaft 8 of the power splitting transmission 2. The input main shaft 7 is directly connected with the crank shaft 9 of the drive prime mover. The output main shaft 8 extends into an additional transmission 10, which forms the intermediate transmission member between the output of the power splitting transmission member between the output of the power splitting transmission 2 and the input of the differential transmission 3.

In the illustrated embodiment of the invention the planetary differential transmission 4 comprises a large sun wheel 11 fixed to the input main shaft 7, a small sun wheel 12, a number of double planet wheels 14 and 15 connected in a rotatable manner with the web 13 which is connected with the output main shaft 8, external gear teeth 16 fixedly joined to the web 13 and an annulus 17. The latter possesses internal gear teeth, which are in mesh with the gear teeth of the planet wheels 14. The small sun wheel 12 is keyed on a hollow shaft 18, which is rotatably mounted on the input main shaft 7 and carries a gear wheel 19 keyed thereon.

A gear wheel 20 is connected with the annulus 17 for the transmission of torque therebetween and it meshes with a gear wheel 21 which is keyed on a shaft 22 which produces a drive connection with the hydrostatic machine 5.

The speed of rotation of the output main shaft 8 is the summation of the speeds of the large sun wheel 11 and of the annulus 17, which determines the speed of rotation of the planet wheels 14 and of the web 13. The hydrostatic machine 5 determines the speed and direction of rotation of the annulus 17, with which it is connected via the gear wheels 21 and 20.

The gear wheel 19 mounted on the hollow shaft 18 meshes with a gear wheel 24 which is able to rotate on its supplementary shaft 23 but is held from moving axially thereon. Adjacent to the gear wheel 24 there is a further gear wheel 25 which is able to rotate on the supplementary shaft 23 while being axially held in place thereon. This gear wheel 25 is in mesh with the external gear teeth 16 on the web 13. The gear wheel 24 is able to be coupled via a clutch SK1 and the gear wheel 25 is able to be coupled via a clutch SK2 with the supplementary shaft 23, there being a clutch member 26 in the illustrated form of the invention which is common to the two clutches SK1 and SK2. This clutch member 26 is keyed on the supplementary shaft 23 and is able to be axially moved between two clutch settings with a neutral clutch setting in between them. The supplementary shaft 23 may be used to produce a direct mechanical connection between the planetary differential transmission 4 and the hydrostatic machine 6, in which case the latter would then have its shaft directly coupled with supplementary shaft 23. In the illustrated embodiment of the invention however there is an indirect connection, in which the supplementary shaft 23 has a gear wheel 27 keyed thereon, which as a component of a transmission leading to the hydrostatic machine 6 is in mesh with a gear wheel 28, which in turn is keyed on a shaft 29 providing the mechanical connection with the hydrostatic machine 6.

The invention provides two consecutive operative ranges defined through the connection between the hydrostatic machine 6 and selectively the output main shaft 8 or with the small sun wheel 12. The first operative range becomes effective when the clutch SK2 is engaged and the clutch SK1 is disengaged so that there is a driving connection from the web 13 and the gear wheel 16 thereon via the gear wheel 25, the supplementary shaft 23 and the train of gears 27 and 28. The second operative range corresponds to the connection from the small sun wheel 12 and the hollow shaft 18 with the gear wheel 19 via the gear wheel 24 with the clutch SK1 engaged (while at the same time the clutch SK2 is disengaged) to the supplementary shaft 23 and from the latter via the train of gears 27 and 28. The transmission ratio between the gear wheel 24 and the gear wheel 19 is substantially lower that the ratio between the gear wheel 25 and the gear wheel 16.

The first operative range is to be used in the speed ratio between the output main shaft 8 and input main shaft 7, i.e. $n_{output}$: $n_{input}$ is between 0 and approximately 50%. In this case the clutch SK2 is engaged and the clutch SK1 is disengaged so that the hydrostatic machine 6 is connected via the shaft 29, the gear wheels 28 and 27, the supplementary shaft 23 and the gear wheels 25 and 16 with the web 13 of the planetary differential transmission 4. In this case of a direction of rotation of the annulus 17 opposite to the direction of rotation of the large sun wheel 11 driven on the engine side, the hydrostatic machine 5 operates as a pump and supplies the converted power to hydrostatic machine 6, which operates then as motor and drives the shaft 29 so that power is transmitted via the above-mentioned drive train to the output main shaft 8. In this case an increase in the speed ratio is accompanied by an increase in the displacement-controlling angle of adjustment of the hydrostatic machine 5 from zero to maximum, while the displacement-controlling angle of the hydrostatic machine 6 is reduced from the maximum towards zero. At the end of this first operational range the speed of rotation of the hydrostatic machine 5 will have decreased to such an extent that the same machine 5 is substantially halted. In this case practically the entire power of the driving prime mover will be mechanically transmitted by the transmission 4 to the output main shaft 8 of the power splitting transmission 2. If now the vehicle is to be further accelerated, in this situation there is a transition to the second operational range, in which the ratio ($n_{output}$: $n_{input}$)) between the output main shaft 8 and the input main shaft 7 is between approximately 50% and 100%. As regards the switching operations required for this transition to the other operational range the clutch SK2 is disengaged and the clutch SK1 is engaged so that the other of the two possible transmissions, that is to say that between hydrostatic machine 6 and the small sun wheel 12 comes into effect. The drive power for the hydrostatic machine 6 now operating as a pump is thus transmitted from the small sun wheel 12 via the hollow shaft 18, the gear wheels 19 and 24, the supplementary shaft 23, the gear wheels 27 and 28 and the shaft 29. In this second operational range the hydrostatic machine 5 thus functions, given the same direction of rotation of the annulus 17 and the large sun wheel 11 as previously, as a motor as was formerly the case and receives its drive power from the hydrostatic machine 6, operating as a pump, via the hydraulic connecting lines, which are omitted from the drawing.

Thus in the first operational range it is possible to achieve an increase in torque between the drive prime mover 1 and the output main shaft 8 of the order of 6. In the second operational range on the other hand with an increase in the said speed ratio (i.e. $n_{output}$: $n_{input}$) so as to be at least equal to 50% the torque will be reduced to about 1 again.

In accordance with the invention the above described power splitting transmission 2, which functions in the manner described so as to transmit the power of the drive prime mover 1 to the output main shaft 8, is associated with an additional transmission 10 which is now described in detail. This additional transmission 10 comprises two different transmissions (i.e. gear trains), which are herein termed second and third transmissions, able to be put into operation by means of a respective clutch SK3 and SK4 so as to provide different ratios between the output main shaft 8 of the power splitting transmission 2 and the input shaft, not specially shown, of the differential transmission 3.

In the case of FIG. 1 there are the following transmission components for making this possible, namely:

a first gear wheel 30 keyed on the output main shaft 8, which is suitably extended, of the power splitting transmission 2, a second gear wheel 34 coupled by means of said second clutch SK4 with the output main shaft 8 of the power splitting transmission 2, a third gear wheel 32 in mesh with the first gear wheel 30 and keyed on an intermediate shaft 31, a fourth gear wheel 33 able to be connected by the first clutch SK3 with the intermediate shaft 31, and a fifth gear wheel 35 connected with the input shaft of the further differential transmission 3, which meshes with the said fourth gear wheel 33.

In this respect the gear wheels 30 and 33 have the same diameter; on the other hand the gear wheels 32, 34 and 35 have a larger, identical diameter, which is approximately four times larger than the diameter of the wheels 30 and 33. Accordingly within the additional transmission 10 in one setting of the clutches, that is to say with clutch SK4 engaged and the clutch SK3 disengaged, there will be a transmission ratio of 1. In the other possible setting, that is to say when the clutch SK4 is disengaged and the clutch SK3 is engaged, there will be a transmission ratio of for instance 1:4 within the additional transmission 10 from the gear wheel 30 to the gear wheel 35.

Figure 2:
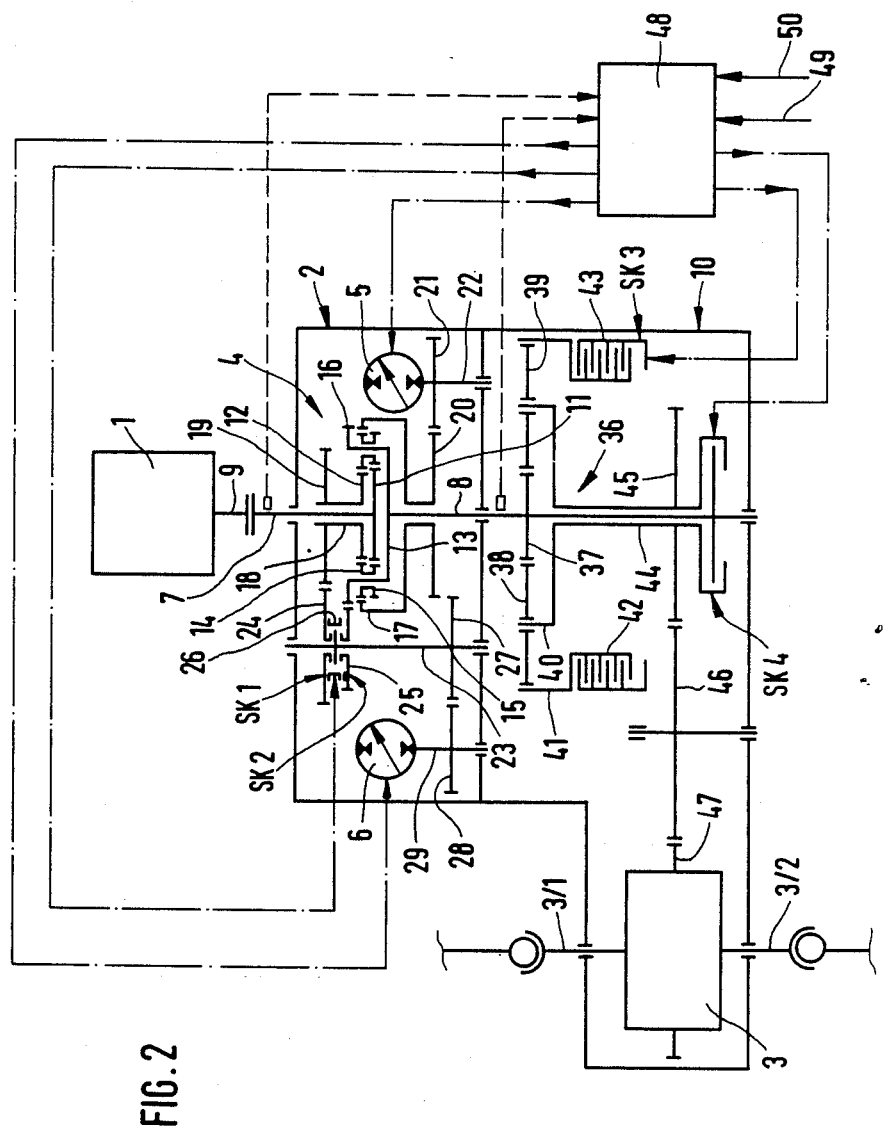
FIG. 2 is a diagram of the second embodiment of the invention.

In the case of the embodiment of the invention shown in FIG. 2 the additional transmission 10 consists of the following components, namely:

a planetary differential transmission 36 with a sun wheel 37 keyed on the suitably extended output main shaft 8 of the power splitting transmission 2 and in mesh with planet wheels 38 and 39 which are carried by a web 40 able to be coupled with the main shaft 8 using the second clutch SK4 and are in mesh with an annulus 41, which is able to be halted by means of the first clutch SK3 which is in the form of a plate clutch 42, 43 and to be released for rotation by same, a first gear wheel 45 connected with the web 40 or a journal 44 thereof, and a second gear wheel 46 meshing with said first gear wheel 45 and a third gear wheel 47 connected with the input shaft of the differential transmission 3 and meshing with the said second gear wheel 46.

The gear wheels 37, 38, 39 and annulus 41 of the planetary differential transmission 36 are so dimensioned that when the clutch SK3 is engaged and the clutch SK4 is disengaged, there will be a transmission ratio of 1:4 while on the other hand when the clutch SK4 is engaged and the clutch SK3 is disengaged there will be a transmission ratio of 1 within the additional transmission 10 between the main shaft 8 and the input shaft of the differential transmission. In lieu of these two fixed-ratio transmissions it would however also be possible to have other trains of gears with other transmission ratios, the larger ratio having to be so selected that on multiplication thereof by the transmission ratio of the power splitting transmission 2 there will be an overall efficiency of the order to 24 of 25 between the drive prime mover 1 and the input of the differential transmission 3.

The operation of the system is performed by a controlling device 48 which, as input signals, is supplied with a signal for the input speed of rotation ($n_{input}$) from the input main shaft 7 via a tacho sensor and with a signal for the speed ($n_{output}$) for the output speed from the output main shaft 8 of the power splitting transmission 2. Furthermore the controlling device 48 is connected with actuating devices for the hydrostatic machines 5 and 6 and the actuating devices for the clutches SK1, SK2, SK3 and SK4. The controlling device 48 responds to the supplied speed of rotation signals and causes a corresponding change in the displacement-controlling angle of the hydrostatic machines 5 and 6 and changeover to the one or the other transmission ratio within the power splitting transmission 2 by suitable operation of the clutches SK1 and SK2, the activation of the controlling device 48 being caused by a request signal 49 from the outside, such request signal being produced by the driver of the vehicle, for example when the driver operates the accelerator pedal.

Irrespective of the effect on the power splitting transmission 2 caused by the controlling device 48, actuation of the additional transmission 10 is possible by sending drive signals to the clutches SK3 and SK4. If the controlling device 48 engages the clutch SK4 and at the same time disengages the other clutch SK3 there will then in this case be a transmission ratio of 1:1 within the additional transmission 10 and accordingly at the input of the differential transmission the conditions will be the same as at the output main shaft 8 of the power splitting transmission 2.

The controlling device 48 may however, owing to the supply of a further request signal 50 to it by the driver of the vehicle, so set the drive device that there is a drastic reduction in speed with a transition from normal travel to crawl speed so that the system is made ready to cope with starting under severe conditions on very rough terrain. For this the controlling device 48, reacting in accordance with a program or internal design engages the clutch SK3 and at the same time disengages the clutch SK4 and abruptly resets the displacement-controlling angle of the hydrostatic machine 6 to zero and that of the hydrostatic machine 5 to the maximum value. In this respect the attainment of the maximum operating pressure in the hydraulic system may be included as a factor for making a decision about performing these switching operations. That is to say, the controlling device 48 sets the two hydrostatic machines 5 and 6 in angular positions and displacement rates as are otherwise only reached at the end of the first operational range when the said ratio ($n_{output}$: $n_{input}$) is equal to about 50%. If this switching operation in accordance with the invention takes place during travel in this operational range, then owing to the transmission ratio of for instance of 1:4 taking effect within the additional transmission 10 there will be a corresponding multiplication by the transmission ratio effective in the power splitting transmission 2 and a corresponding multiplication of the conversion range. In the case of a departure from 50% of this ratio ($n_{output}$: $n_{input}$) upwards or downwards there is drop of this given maximum overall conversion range to a lower value.

If crawl travel is to be terminated and transition to normal travel is desired, something that may be communicated to the controlling device 48 by a signal 49, the controlling device causes the clutch SK4 to be engaged and the clutch SK3 to be simultaneously disengaged and the angle of the hydrostatic machine 5 and of the hydrostatic machine 6 to be abruptly set and respectively at maximum and, respectively, zero. As a result the transmission ratio of the additional transmission changes back to the value of 1:1, because when the said switching operation takes place the output speed of rotation $n_{output}$ of the power splitting transmission considerably decreases and it will be observed that the drive prime mover 1 will run at a very constant speed or with only a negligible drop in its speed of rotation.

The provision of the additional transmission 10 in accordance with the invention with its two different gear wheel trains and with the clutches SK3 and SK4 and manner of operating these clutches and changing the displacement-controlling angle of the two hydrostatic machines 5 and 6 thus makes it possible to deliver a comparatively high, extreme torque to the axle drive trains whenever the necessity arises, such provision being conveniently possible during travel.

It remains to be noted that the action of the clutches SK3 and SK4 takes place independently of operation of the clutches SK1 and SK2, but however in a manner dependant on the respective switching state and the state of the drive transmission ratio in the transmission combination.

What is claimed is:

1. A drive device for a vehicle comprising:
   a drive prime mover,
   a power splitting hydrostatic-mechanical transmission coupled with said prime mover and comprising a planetary differential transmission including four shafts, two groups of planet wheels, two sun wheels, a web and an annulus,
   two main shafts constituting two of said four shafts of the planetary differential transmission, said two main shafts forming an input and output of said transmission,
   a differential connected to drive front and rear axle drive trains of the vehicle,
   clutch means,
   two variable displacement hydrostatic machines respectively connected in at least one operational range with said planetary differential transmission and adapted to alternately operate as a pump and as a motor, a first one of said hydrostatic machines which, when the second hydrostatic machine is stationary, being able to be switched over from the input main shaft to one of the sun wheels on transition from a first operational range to a second operational range by said clutch means and during traction operation being switched over from the motor to the pump function, wherein said drive device further comprises:
   an additional mechanical transmission connected to the output main shaft of said power splitting transmission and including gearing and two clutches for operation in two transmission ratios, and a controller which on switching from one of the said transmission ratios to the other causes actuation of said two clutches as well as a sudden opposite modification of displacement controlling angles of said first and second hydrostatic machines to cause the displacement of the second hydrostatic machine to be increased to a maximum while the displacement of said first hydrostatic machine decreases to zero, said additional transmission comprising:
   a first gear wheel keyed on the output main shaft of the power splitting transmission,
   a second gear wheel coupled by one of said two clutches with the output main shaft of the power splitting transmission,
   a third gear wheel in mesh with the first gear wheel and keyed on an intermediate shaft,
   a fourth gear wheel able to be connected by the other of said two clutches with the intermediate shaft,
   and a fifth gear wheel in mesh with said fourth gear wheel and drivingly connected with said differential.

2. The drive device as claimed in claim 1 wherein said switching over to one of said transmission ratios takes place during acceleration in the second operational range and during deceleration after return to the first operational range.

3. The drive device as claimed in claim 1 wherein the second, third and fifth gear wheels have the same diameter, and said first and fourth gear wheels have the same diameter, said diameter of the second, third and fifth gear wheels being larger than the diameter of the first and fourth gear wheels.

4. A drive device for a vehicle comprising:
   a drive prime mover,
   a power splitting hydrostatic-mechanical transmission coupled with said prime mover and comprising a planetary differential transmission including four shafts, two groups of planet wheels, two sun wheels, a web and an annulus,
   two main shafts constituting two of said four shafts of the planetary differential transmission, said two main shafts forming an input and output of said transmission,
   a differential connected to drive front and rear axle drive trains of the vehicle,
   clutch means,
   two variable displacement hydrostatic machines respectively connected in at least one operational range with said planetary differential transmission and adapted to alternately operate as a pump and as a motor, a first one of said hydrostatic machines which, when the second hydrostatic machine is stationary, being able to be switched over from the input main shaft to one of the sun wheels on transition from a first operational range to a second operational range by means of said clutch means and during traction operation being switched over from the motor to the pump function, wherein said drive device further comprises:
   an additional mechanical transmission connected to the output main shaft of said power splitting transmission and including gearing and two clutches for operation in two transmission ratios, and a controller which on switching from one of the said transmission ratios to the other causes actuation of said two clutches as well as a sudden opposite modification of displacement controlling angles of said first and second hydrostatic machines to cause the displacement of the second hydrostatic machine to be increased to a maximum while the displacement of said first hydrostatic machine decreases to zero, said additional transmission comprising:
   a further sun wheel keyed on the output main shaft of the power splitting transmission and in mesh with planet wheels which are carried by a further web able to be coupled with the output main shaft via one of said two clutches, said planet wheels of the additional transmission being in mesh with a further annulus, which is selectively able to be halted by the other of said two clutches or released thereby for rotation,
   a first gear wheel connected with the further web,
   a second gear wheel meshing with said first gear wheel and having the same diameter as said first gear wheel, and
   a third gear wheel drivingly connected with said differential and meshing with said second gear wheel.

5. The drive device as claimed in claim 4 wherein said two clutches of said additional transmission each comprises a plate clutch.

* * * * *